US012643061B2

(12) United States Patent
Surdick et al.

(10) Patent No.: US 12,643,061 B2
(45) Date of Patent: Jun. 2, 2026

(54) FILTER ASSEMBLY WITH AUTHENTICATING FILTER ELEMENT COUPLING AND REPLACEABLE DROP-IN TWIST LOCKING FILTER ELEMENT THEREFOR

(71) Applicant: Schroeder Industries, LLC, Leetsdale, PA (US)

(72) Inventors: Scott F. Surdick, Dormont, PA (US); Christopher B. Bortnik, Warrendale, PA (US); Michael Limbacher, Pittsburgh, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 1472 days.

(21) Appl. No.: 16/598,434

(22) Filed: Oct. 10, 2019

(65) Prior Publication Data

US 2020/0114288 A1 Apr. 16, 2020

Related U.S. Application Data

(60) Provisional application No. 62/743,676, filed on Oct. 10, 2018.

(51) Int. Cl.
*B01D 29/96* (2006.01)
*B01D 29/11* (2006.01)

(52) U.S. Cl.
CPC .............. *B01D 29/96* (2013.01); *B01D 29/11* (2013.01); *B01D 2201/4053* (2013.01); *B01D 2201/52* (2013.01)

(58) Field of Classification Search
CPC .... B01D 2201/4015; B01D 2201/4046; B01D 2201/4053
See application file for complete search history.

(56) References Cited

U.S. PATENT DOCUMENTS

| | | | |
|---|---|---|---|
| 4,322,231 | A | 3/1982 | Hilzendeger |
| 4,955,566 | A | 9/1990 | Bolich |
| D322,349 | S | 12/1991 | Harris |
| D412,551 | S | 8/1999 | Smith et al. |
| 6,372,133 | B1 | 4/2002 | von der Hardt et al. |
| D457,283 | S | 5/2002 | Wayt |

(Continued)

FOREIGN PATENT DOCUMENTS

| | | |
|---|---|---|
| RU | 56978 U1 | 9/2006 |
| WO | 2011047913 | 4/2011 |

(Continued)

*Primary Examiner* — Benjamin M Kurtz
(74) *Attorney, Agent, or Firm* — Blynn L. Shideler; Krisanne Shideler; BLK Law Group

(57) ABSTRACT

A filter assembly with an authenticating filter element coupling, formed of the combination of a keyed bushing and locking guide, and replaceable drop-in twist locking filter element therefor. The keyed bushing is coupled a housing of the filter assembly and provides an authenticating mechanism for a replaceable filter element suited for the specific housing wherein the keyed bushing forms ½ of the authenticating coupling for the filter assembly. The locking guide is coupled to an endcap of a filter element and has a sleeve with slots in an end thereof that match keys of the associated keyed bushing on a filter housing. The locking guide forms ½ of the authenticating coupling for the filter assembly.

13 Claims, 2 Drawing Sheets

(56) References Cited

U.S. PATENT DOCUMENTS

| | | |
|---|---|---|
| 6,740,234 B1 | 5/2004 | Williams et al. |
| D528,630 S | 9/2006 | Booth |
| D545,396 S | 6/2007 | Casey et al. |
| D634,398 S | 3/2011 | Ickes et al. |
| 7,927,392 B2 | 4/2011 | Clements |
| 8,057,669 B2 | 11/2011 | Beard |
| D658,740 S | 5/2012 | Ickes et al. |
| 9,023,202 B2 | 5/2015 | Beard |
| 2012/0018359 A1* | 1/2012 | Sann .................. B01D 35/0276 |
| | | 210/136 |
| 2019/0046904 A1* | 2/2019 | Noren .................... B01D 35/16 |

FOREIGN PATENT DOCUMENTS

| | | | |
|---|---|---|---|
| WO | 2013106185 | 7/2013 | |
| WO | WO 2017/050368 | * 3/2017 | ............. B01D 29/21 |

* cited by examiner

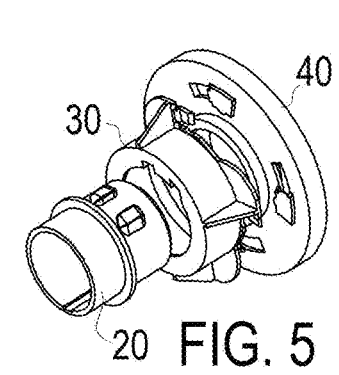
30    40
20    FIG. 5
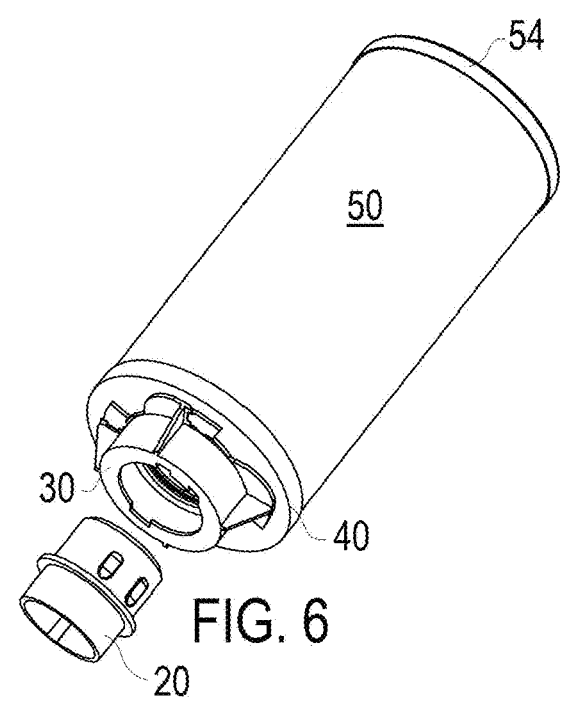
54
50
30    40
20    FIG. 6
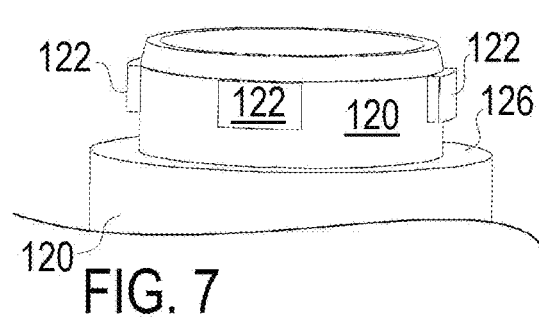
122    122
122    120    126
120    FIG. 7
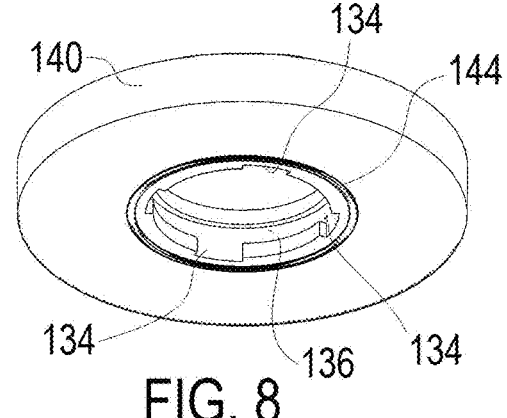
134
140    144
134    136    134
FIG. 8
FIG. 9
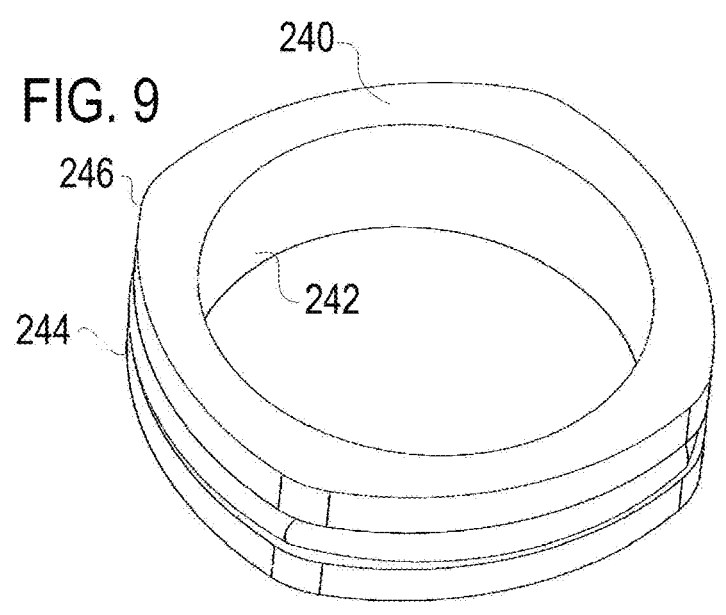
240
246
242
244

FILTER ASSEMBLY WITH AUTHENTICATING FILTER ELEMENT COUPLING AND REPLACEABLE DROP-IN TWIST LOCKING FILTER ELEMENT THEREFOR

RELATED APPLICATIONS

This application claims priority to U.S. patent application Ser. No. 62/743,676 filed Oct. 10, 2018, titled "Filter Assembly with Authenticating Filter Element Coupling and Replaceable Drop-in Twist Locking Filter Element Therefor" which application is incorporated herein by reference in its entirety.

BACKGROUND INFORMATION

1. Field of the Invention

The present invention relates to filter assemblies, and more particular to a filter assembly with authenticating filter element coupling and replaceable drop-in twist locking filter element therefor.

2. Background Information

Filtration systems are traditionally considered a fluid treatment and can also be considered as a part of contamination management. Contamination management is defined herein as relating to the analysis and optimization of processes with regard to the cleanliness of components, systems and the purity of the fluids used. In modern hydraulic systems smaller, lighter and more powerful components are currently being used compared to only a decade ago. The use of these components also means that the demand of system cleanliness is now much higher, as has been shown by various studies. As much as 90% of all hydraulic system outages are due to increased contamination. This failure rate applies to more than classic hydraulics industry. Contamination management, such as through the design and implementation of appropriate filter assemblies, is a key issue in the design and maintenance of hydraulic or fluid power systems used in a general sense for all industries.

In general, filtration systems include i) disposable units in which the filtration media and housing are integrated into a single use unit, often called "spin-ons" due to a commonly implemented threaded attachment technique; ii) filter assemblies having replaceable units in which the filtration media is formed in a filter element (AKA a filter cartridge) that can be removed from a unit housing forming a filter assembly; and iii) filtration units with cleanable media, which are cleaned by a process such as back-flushing.

Thus a filter element, also called a filter cartridge, within the meaning of this application, is a unit including filter media that is configured to be received in a filter assembly housing, and is sometimes referenced as a drop in element. The filter assembly is one, or more, filter housings and associated filter elements together with other components of the unit such as a control, test points, particle counters, bypass valves, etc.

The maintenance of a filter assembly having replaceable filter elements obviously requires the periodic replacement of the filter elements. One difficulty is that the replacement filter element must be suitable for the application in which it is being placed. The system can easily breakdown if a replaceable filter element is replaced with a filter element not rated for the particular application.

There is a need for a cost effective, efficient, filter assembly with replaceable filter elements which can easily authenticate replacement filter elements.

SUMMARY OF THE INVENTION

This invention is directed to a cost effective, efficient, filter assembly with authenticating filter element coupling and replaceable drop-in twist locking filter element therefor. A filter assembly includes an authenticating filter element coupling, formed of the combination of a keyed bushing and locking guide, and replaceable drop-in twist locking filter element therefor. The keyed bushing is coupled a housing of the filter assembly and provides an authenticating mechanism for a replaceable filter element suited for the specific housing wherein the keyed bushing forms ½ of the authenticating coupling for the filter assembly. The locking guide is coupled to an endcap of a filter element and the locking guide has a sleeve with slots in an end thereof that match keys of the associated keyed bushing on a filter housing. The locking guide forms ½ of the authenticating coupling for the filter assembly.

One aspect of the invention provides a filter assembly including a filter element housing an authenticating filter element coupling; and a replaceable drop-in twist locking filter element. The filter assembly may provide wherein the housing includes a keyed bushing coupled thereto that provides an authenticating mechanism for a replaceable filter element suited for the specific housing wherein the keyed bushing forms ½ of the authenticating coupling for the filter assembly. The filter assembly may provide wherein the keyed bushing includes a set of uniquely arranged keys on the radial periphery of the bushing. The filter assembly may provide wherein the keyed bushing includes a flange configured to rest on the housing and a sealing surface above the specific keys. The filter assembly may provide wherein the filter element includes an endcap with a sealing O-ring wherein the sealing surface is to be engaged with a sealing O-ring of the end cap of the filter element. The filter assembly may provide wherein the authenticating coupling for the filter assembly includes a locking guide having a sleeve with slots in an end thereof that match the keys of the associated keyed bushing. The filter assembly may provide wherein the sleeve includes a detent member that will engage and secure with one key upon insertion and rotation of the filter element relative to the keyed bushing. The filter assembly may provide wherein the locking guide includes interconnect tab structures for coupling a specific locking guide to a given end cap of a filer element.

These and other advantageous aspects of the invention will be clarified in connection with the attached figures in which like reference numerals represent like elements throughout.

BRIEF DESCRIPTION OF THE DRAWINGS

FIG. 5 is an exploded view of the keyed bushing, locking guide and end cap of FIG. 1;

FIG. 6 is an exploded view of replaceable drop-in twist locking filter element and authenticating filter element coupling of FIG. 1;

FIG. 7 is a perspective view of a modified keyed bushing of a modified authenticating filter element coupling of a filter assembly of the present invention;

FIG. 8 is a perspective view of a modified integrated endcap and locking guide of the modified authenticating filter element coupling of FIG. 7;

FIG. 9 is a perspective view of a modified integrated endcap and key-shaped bushing of the modified authenticating filter element coupling of the present invention.

BRIEF DESCRIPTION OF THE PREFERRED EMBODIMENTS

Figures 1, 2A, 2B, 2C, 2D, 2E, 3A, 3B, 3C, 3D, 3E, 4A, 4B, 4C, 4D, 4E:
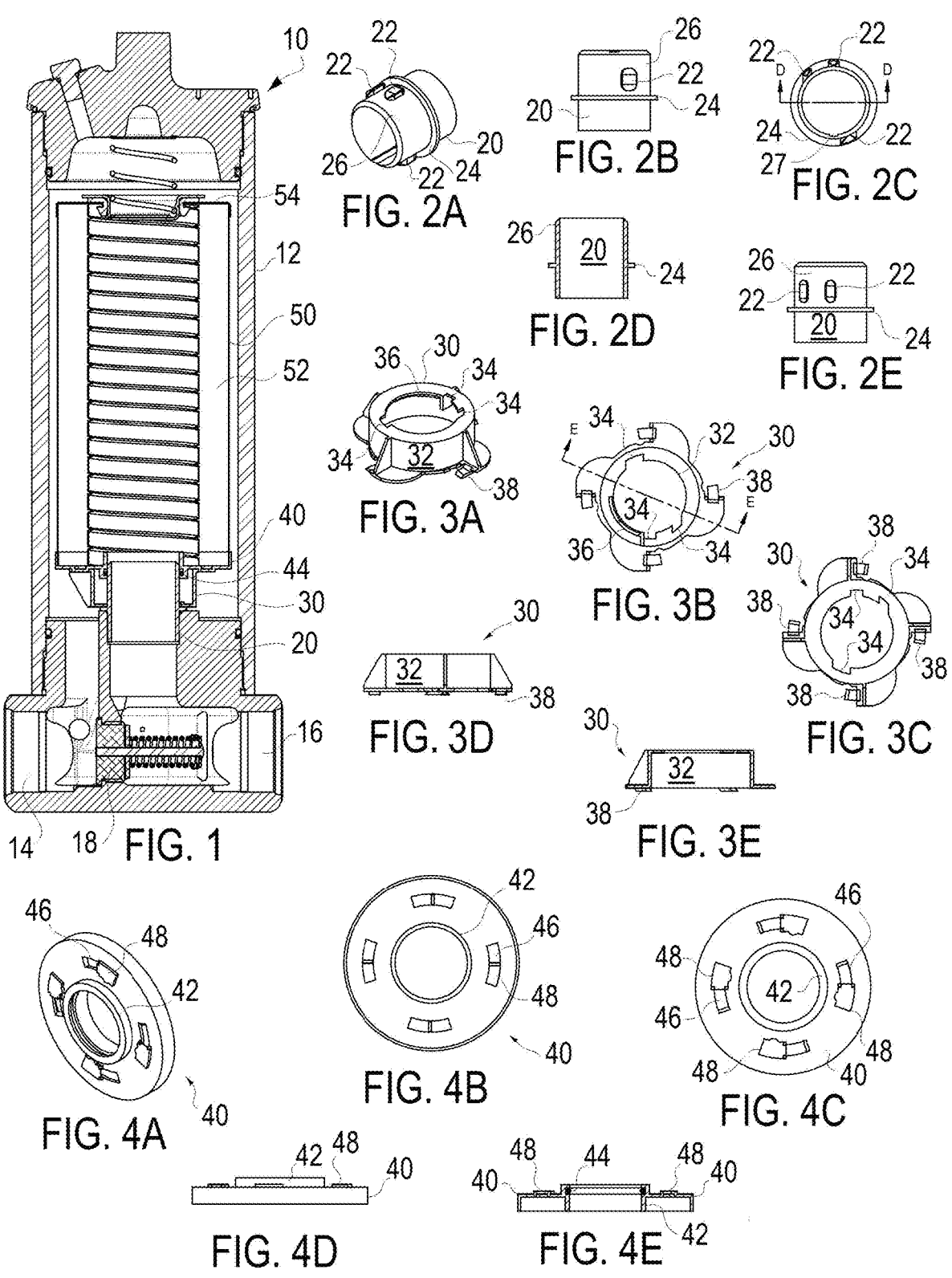
FIG. 1 is a side elevation section view of a filter assembly with authenticating filter element coupling and replaceable drop-in twist locking filter element therefor according to one embodiment of the present invention.
FIGS. 2A-E are views of a keyed bushing of the authenticating filter element coupling of the filter assembly of FIG. 1.
FIGS. 3A-E are views of a locking guide of the authenticating filter element coupling of the filter assembly of FIG. 1.
FIGS. 4A-E are views of an endcap of a filter element that couples to a locking guide of the authenticating filter element coupling of the filter assembly of FIG. 1.

This invention is directed to a cost effective, efficient, filter assembly 10 shown in FIG. 1 with a filter element housing 12 having an inlet/outlet 14, outlet/inlet 16 and bypass valve 18. Component 14 is an inlet and 16 an outlet when designed for outside-in flow and vice versa for inside-out flow. The bypass valve 18 is orientated to allow for bypass from the inlet (14 or 16) to the outlet (16 or 14) during blinding or clogging of the filter element, and obviously as shown will operate in only one direction. The configuration of the bypass valve 18 from that shown would change with a change in operational flow direction of the assembly 10.

As described below the invention is directed to a with filter assembly 10 with an authenticating filter element coupling, formed of the combination of a keyed bushing 20 and locking guide 30, and replaceable drop-in twist locking filter element 50 therefor.

The housing 12 includes a keyed bushing 20 coupled thereto that provides an authenticating mechanism for a replaceable filter element suited for the specific housing 12. The bushing 20 is press fit or threaded onto the housing 12.

The keyed bushing 20 forms ½ of the authenticating coupling for the filter assembly 10. The keyed bushing 20 is shown individually in FIGS. 2A-2E and includes a set of uniquely arranged keys 22 on the periphery of the bushing that are associated with, or in other words that define, a specific filter element rating/configuration for the assembly 10. The specific radial positioning of three keys 22 are believed to be sufficient to yield an extremely large number of unique key arrangements. Given that the specific keys 22 may have varied widths the possible unique position and size arrangements of three keys is effectively limitless.

The keys 22 are orientated parallel to each other as opposed to radially extending so as to improve molding and allow simple two piece mold construction. The keyed bushing includes a flange 24 to rest on the housing 12 and a sealing surface 26 above the specific keys 22. The sealing surface 26 is to be engaged with a sealing O-ring of the end cap 40 of the filter element 50. The inner diameter of the bushing 20 includes a notch 27 that assures the proper sealing occurs on the sealing surface 26 rather than on the inside surface.

The authenticating coupling for the filter assembly 10 includes a locking guide 30 shown in FIGS. 4A-D. The locking guide 30 forms ½ of the authenticating coupling for the filter assembly 10 and includes a sleeve 32 with slots 34 in an end thereof that match the keys 22 of the associated keyed bushing 20. The sleeve 32 includes a detent member 36 or simply a detent 36 in the form of a ramp and perimeter stop that will engage with and secure one key 22 upon insertion and rotation of the filter element 50 and guide 30 relative to the keyed bushing 20.

The leading key 22 will engage the ramp of the detent 36 and create a tight function lock with the stop of the detent 36 preventing further rotation. The locking guide 30 includes interconnect tab structures 38 for coupling a specific locking guide 30 to a given end cap 40 of a filer element 50. The locking guide 30 together with the keyed bushing 20 form an authenticating coupling and are unique to a given filter assembly rating or classification. Thus only a filter element 50 with a matching locking guide 30 can be used with a given assembly 10 having the bushing 20.

The locking guide 30 is secured to an endcap 40 of a filter element 50. The guide 30 may effectively be epoxied onto the endcap 40 and be integral therewith after coupling. The endcap 40 is shown in FIGS. 4A-E and includes a sleeve 42 with radial sealing O-ring 44. The sleeve 42 of the endcap 40 receives the sealing face 26 of the keyed bushing 20 and the O-ring 44 seals against the sealing face 26. The slots 46 receive tabs 38 that engage detents 48 to secure the locking guide to the end cap 40. The construction and operation of slots 46 detents 48 and associated tab structure 38 is well known in the art and can take many forms for interconnecting these components. The filter element 50 includes filter media 52 extending between the endcap 40 and an upper endcap 54. The filter media 52 can be pleated media or composite media structures or any desired configuration.

In operation when a given filter assembly 10 is designed then a unique keyed bushing 20 is developed and coupled to the assembly 10. The unique keyed bushing 20 matches with an associated locking guide 30 that is coupled to replaceable filter elements 50 having the designated rating for the assembly 10.

FIG. 7 is a perspective view of a modified keyed bushing 120 of a modified authenticating filter element coupling of a filter assembly 10 of the present invention. Here the sealing face 126 is a radial flange 126 rather than a circumferential face, but still provides unique radial keys 122 (four in this embodiment).

FIG. 8 is a perspective view of a modified integrated endcap and locking guide 140 of the modified authenticating filter element coupling of FIG. 7. Here the sealing O-ring 144 is radially outside of the slots 134 that are sized to receive and match the keys 122. A detent 136 receives the keys 122 when twisted into position after insertion. In this embodiment the portion of the endcap and integrated locking guide 140 radially within the O-ring 144 could easily be formed by a grommet that is popped into a more generic outer portion.

The position of the keyed bushing 20 on the housing 12 and the locking guide 30 may be reversed with the bushing 20 on the endcap 40 and the locking guide 30 on the housing 12.

FIG. 9 illustrates a modified integrated endcap and key-shaped bushing 240 of a modified authenticating filter element coupling of the present invention. The endcap and key-shaped bushing 240 forms an endcap for a filter element 50 and includes an inner sleeve 242 and an outer sealing O-ring 244 sealing against a sealing face of a sleeve of a locking guide (not shown). In this embodiment, instead of keys 22 on the bushing 240, the outer perimeter 246 is formed of a unique profile (here a rounded square) that matches with a unique profile of the locking guide (not shown) to form the authenticating coupling. Without the complementary shaped components the O-ring seal 244 will not form a seal even if the bushing 240 were to fit. The embodiment of FIG. 9 is not a twist to lock arrangement, but is merely linearly advanced into position. The embodiment still provides the authentication desired.

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A filter assembly comprising:

A filter element housing;

An authenticating filter element coupling including a keyed bushing having a set of at least three keys on a radial periphery of the keyed bushing wherein the keys of the set of at least three keys are unequally circumferentially spaced from each other about a periphery of the keyed bushing, and including a locking guide having a sleeve with slots in an end thereof that match the set of at least three keys of the keyed bushing; and a replaceable drop-in twist locking filter element.

2. The filter assembly according to claim 1, wherein the filter element housing includes the keyed bushing coupled thereto.

3. The filter assembly according to claim 2, wherein the keyed bushing includes a flange configured to rest on the filter element housing and a sealing surface above the set of at least three keys.

4. The filter assembly according to claim 3, wherein the replaceable drop-in twist locking filter element includes an endcap with a sealing O-ring wherein the sealing surface of the keyed bushing is to be engaged with the sealing O-ring of the end cap of the replaceable drop-in twist locking filter element.

5. The filter assembly according to claim 1, wherein the sleeve of the locking guide includes a detent that will engage and secure with one key of the set of keys of the keyed bushing upon insertion and rotation of the replaceable drop-in twist locking filter element relative to the keyed bushing.

6. The filter assembly according to claim 1, wherein the replaceable drop-in twist locking filter element includes a lower endcap and wherein the locking guide includes interconnect tab structures for coupling the locking guide to the lower end cap of the replaceable drop-in twist locking filter element.

7. The filter assembly according to claim 6, wherein the replaceable drop-in twist locking filter element includes filter media extending between the lower endcap and an upper endcap, and wherein the lower endcap includes a sealing O-ring.

8. A replaceable drop-in twist locking filter element and locking guide comprising:

A filter element including i) an upper endcap; ii filter media extending from the upper endcap; and iii) a lower endcap coupled to an end of the filter media, the lower endcap including a sealing O-ring; and a locking guide coupled to the lower endcap and having a sleeve with a set of at least three slots in an end thereof wherein the end includes a circular opening and wherein the set of at least three slots extend radially outwardly from the circular opening and the slots of the set of at least three slots are unequally circumferentially spaced about the circular opening, and wherein the set of at least three slots is configured to receive a set of keys of an associated keyed bushing on a filter housing.

9. A filter assembly comprising:

a filter element housing;

an authenticating filter element coupling including a keyed bushing having a set of at least three keys on a radial periphery of the keyed bushing wherein the keys of the set of at least three keys are unequally circumferentially spaced from each other about a periphery of the keyed bushing, and including a locking guide having a sleeve with slots in an end thereof that match the set of at least three keys of the keyed bushing; and a replaceable filter element including upper and lower endcaps and filter media extending from the upper endcap to the lower endcap, the lower endcap including a sealing O-ring;

wherein the locking guide includes interconnect tab structures for coupling the locking guide to the lower end cap of the replaceable filter element.

10. The filter assembly according to claim 9, wherein the filter element housing includes the keyed bushing coupled thereto.

11. The filter assembly according to claim 10, wherein the keyed bushing includes a flange configured to rest on the filter element housing and a sealing surface above the set of at least three keys.

12. The filter assembly according to claim 11, wherein the lower endcap with the sealing O-ring provides a radially orientated seal.

13. The filter assembly according to claim 11, wherein the sleeve includes a detent that will engage and secure with one key of the set of keys of the keyed bushing upon insertion and rotation of the replaceable filter element relative to the keyed bushing.

* * * * *